United States Patent Office 3,523,062
Patented Aug. 4, 1970

3,523,062
METAL-LINED CONCRETE PRESSURE VESSEL OF A NUCLEAR REACTOR
Brian David Brown, Bexley, Kent, England, assignor to Atomic Power Constructions Limited, Sutton, Surrey, England, a British company
Filed Nov. 24, 1967, Ser. No. 685,676
Claims priority, application Great Britain, Nov. 30, 1966, 53,555/66
Int. Cl. G21c 19/28
U.S. Cl. 176—58         9 Claims

ABSTRACT OF THE DISCLOSURE

A mounting for a circulator for circulating coolant through the core of a gas-cooled nuclear reactor comprising a flexible sleeve fixed at one end to the reactor pressure vessel wall and at the other end to the housing of the circulator.

BACKGROUND OF THE INVENTION

This invention relates to metal-lined concrete pressure vessels having means for circulating a fluid therein.

With metal-lined concrete pressure vessels having means for circulating a fluid therein, for example, the pressure vessel of a gas-cooled reactor, a fluid-tight seal is provided between the means for circulating the fluid and the metal lining. The fluid-tight seal has to be flexible because the gas-cooled reactor pressure vessel, for example, is liable to distort through, among other things, prestressing of the pressure vessel or thermal expansions or contractions thereof. With such pressure vessels it is usual to place the fluid circulating means in an opening in the metal-lined side of the pressure vessel wall in order to avoid having to use an unduly large pressure vessel which would be required if the circulating means were housed inside the vessel. When the fluid circulating means is mounted in an opening in the pressure vessel wall it is necessary to maintain a required location of the fluid circulating means within the opening even after the pressure vessel has distorted and altered the size or shape of the opening.

SUMMARY OF THE INVENTION

By the present invention there is provided a metal-lined concrete pressure vessel having an opening and, disposed at least in part within the opening, fluid circulating means which is located and supported in the opening by a flexible sleeve which extends round the circulating means and has one end sealed to the means while the other end is attached to the vessel and sealed to the lining thereof.

The opening may be provided with a metal lining which is sealed to the metal lining of the pressure vessel, the sleeve being sealed to the metal lining of the opening.

To provide improved support for the other end of the sleeve, the latter end may be embedded in the concrete of the pressure vessel and may be flanged at that other end.

The sleeve may taper from its other end towards the circulating means. The sleeve may, alternatively, be in the form of a hollow truncated cone or a hollow cylinder.

In one embodiment of the invention, the circulating means is sealed to the sleeve by a substantially rigid metal ring which encircles the circulating means. The metal ring may be integral with the sleeve and be bolted to the circulating means.

The circulating means may include a housing, containing an anti-back-turning device, thrust and bearing assembly, a driving shaft extending from the housing, there being impeller blades on the shaft. The housing is sealed to the sleeve.

The sleeve also supports a bearing for the driving shaft.

DESCRIPTION OF THE PREFERRED EMBODIMENT

Figure 1:
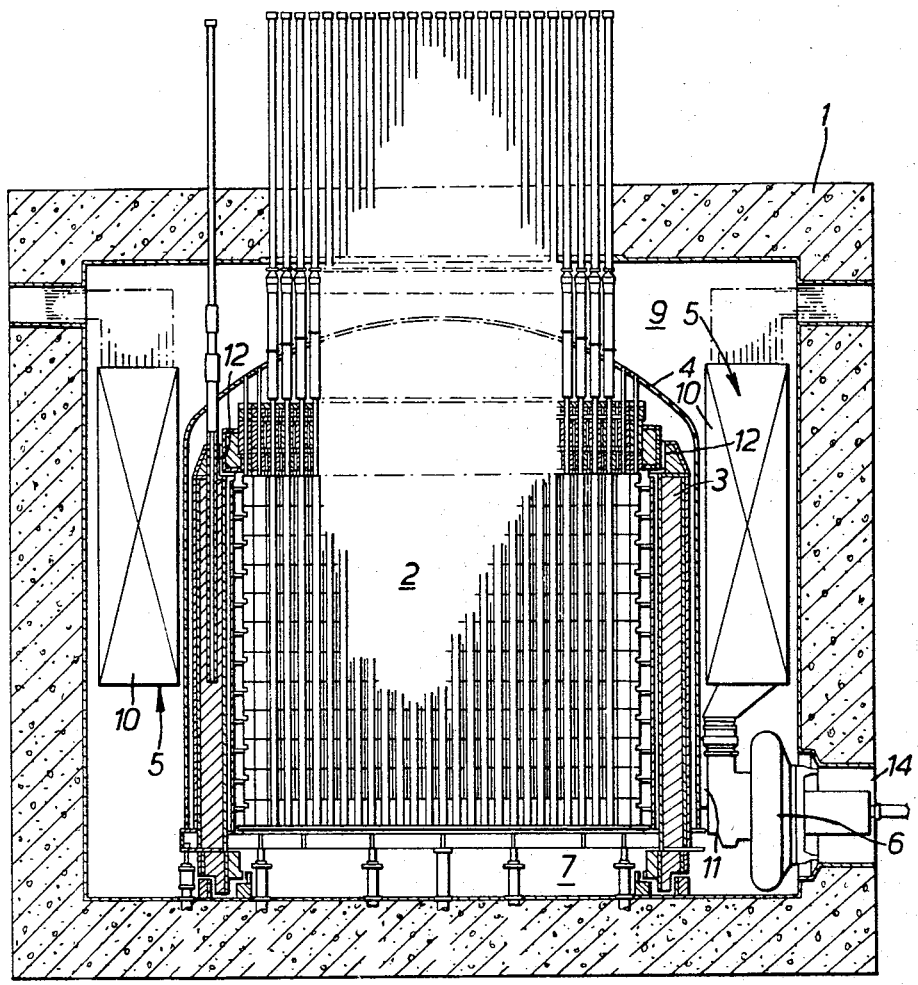
FIG. 1 is a sectional side view showing a gas-cooled nuclear reactor in diagrammatic form only.

In FIG. 1 a metal-lined concrete pressure vessel 1 houses a core 2, an inverted cup-shaped biological shield 3, an inverted cup-shaped partition 4, heat exchangers 5, and gas circulating means, one only of which is shown and designated 6. The gas is circulated, by the gas circulating means from a plenum chamber 7 beneath the core, upwardly through passages (not shown) through the core 2, to a space 9 above the partition 4. From the space 9 the gas passes downwardly through casings 10 containing the heat exchangers 5, and is passed by the means to inlet boxes one only of which is shown and designated 11 (see FIGS. 1 to 3). Several circulating means are provided and are spaced round the periphery of the partition 4. As can be seen from FIG. 3, the inlet box 11 is circumferentially displaced from the circulating means 6. At the inlet boxes the gas passes through the partition 4, passes upwardly between the partition 4 and biological shield 3. A portion of the gas flow then passes downwardly through passages 12 to the space between the biological shield 3 and core 2 and so back to the plenum chamber 7. The remaining gas passes downwardly through passages (not shown) in the core 2 to the plenum chamber 7 where both portions of the gas mix with one another before moving upwardly through the core as disclosed above. The gas flow path is thus of the "reentrant" flow pattern.

Figure 2:
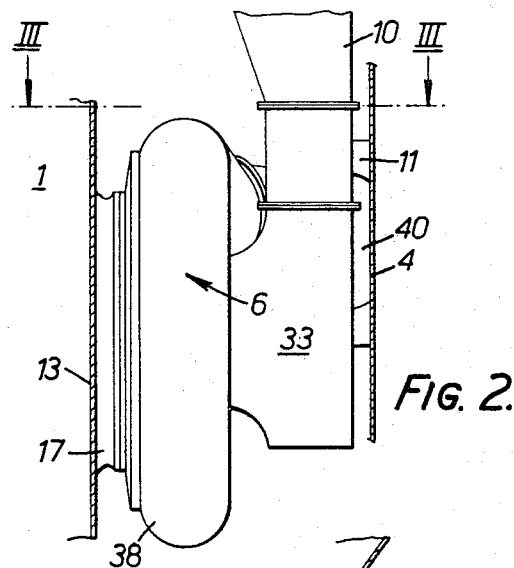
FIG. 2 is an enlarged side view of a coolant gas ducting in FIG. 1.
Figure 3:
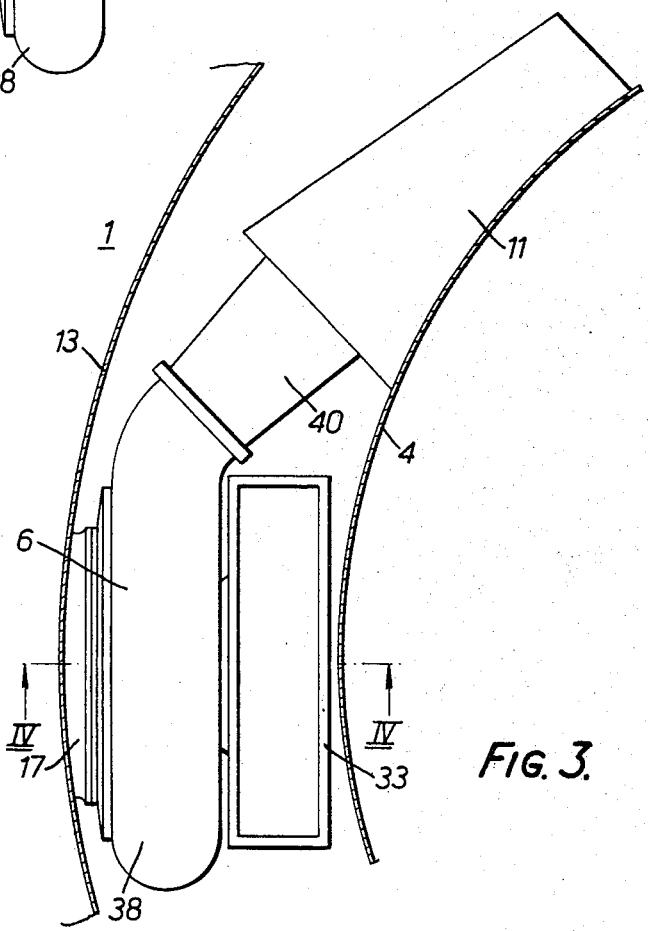
FIG. 3 is a plan view along III—III, FIG. 2, and,
FIG. 4 is a similar view to FIG. 2 except that the upper half is sectioned along IV—IV, FIG. 3.
Figure 4:
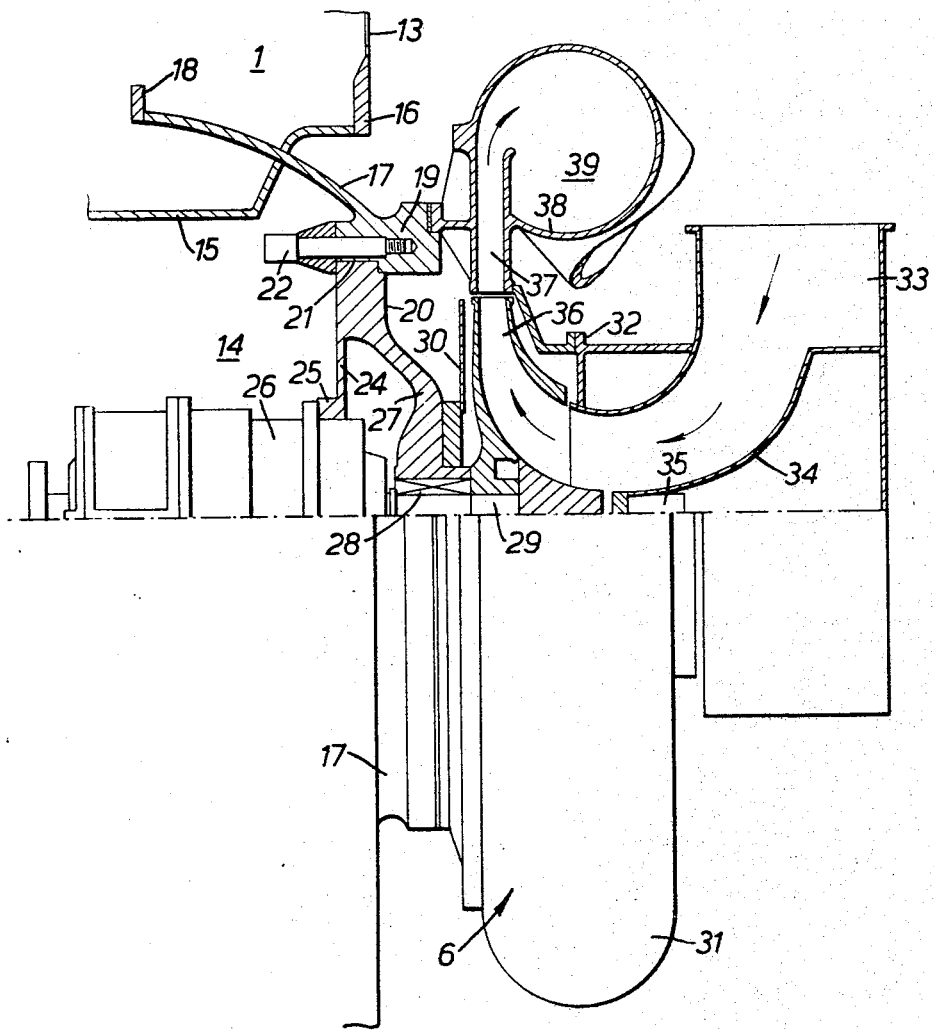

In FIGS. 2 to 4 which show the gas circulating assembly 6 in greater detail the metal lining of the pressure vessel 1 is shown and designated 13. The means 6 extends from an opening 14 (FIG. 4) in the pressure vessel 1. Each opening 14 has a metal lining 15 which is sealed to an annular metal plate 16 disposed around the opening 14 and the metal plate 16 is in turn sealed to the metal lining 13. A flexible metal sleeve 17, which has a flanged portion 18 at one end which is embedded in the concrete of the pressure vessel 1, passes through and is sealed to the metal lining 15. As can be seen from FIG. 4, the sleeve 17 tapers from the flanged portion 18 towards the circulating means 6. The other end of the sleeve 17 has a substantially rigid metal ring 19 integral therewith. An annular member 20 is clamped into a recess 21 in the metal ring 19 by a plurality of bolt assemblies, one of which is shown and designated 22. The member 20 has an annular web 24 supporting an annular flange 25 to which a housing 26, containing an anti back-turning device, for example, a ratchet, thrust and bearing assembly, is secured and sealed. The anti back-turning device prevents back pressure or reverse flow of coolant rotating the circulator when the latter is back driven. A further annular web 27 has a gas-tight bearing 28 which supports a driving shaft 29 from the housing 26 whilst allowing the shaft 29 to rotate. The annular web 27 also supports an annular baffle 30. Mounted on the driving shaft 29 are a plurality of impeller blades, one of which is shown and designated 36, for withdrawing gas from a gas ducting 33.

The gas ducting 33 has a gas entry portion sealed to an outlet end of the heat exchanger casing 10 (FIG. 2). The gas ducting 33 has an inner funnel-shaped partition 34 (FIG. 4) which forms the inside of the gas ducting 33 into a horizontally extending and tapering annular passage. A member 35 seals the interior of the partition 34. A part 38 is divided to form a plurality of radially extending passages 37 which lead to an annular outlet passage 39 in part 38. The gas ducting 33 is sealed to the part 38 by annular partitioning 32. The part 38 is supported by the metal ring 19 and the annular passage 39 therein is connected to its respective inlet box 11 by a connecting piece 40 (FIG. 3).

In operation the driven shaft 29 rotates each impeller blade 36 to draw gas (as shown in arrows) along the gas ducting 33 and pass it between the impeller blades to the passages 37. From here the gas enters the passage 39 and is delivered to the resptctive inlet box 11.

Should the pressure vessel distort to alter the opening 14 the sleeve 17 will flex to accommodate the alterations whilst maintaining the gas circulating assembly 6 aligned in the opening 14.

In other embodiments the sleeve 17 is, for example, a hollow truncated cone or a hollow cylinder.

I claim:

1. A metal-lined concrete pressure vessel of a nuclear reactor, said pressure vessel having an opening in the wall thereof and, disposed at least in part within the opening, fluid circulating means which is located and supported in the opening by a flexible sleeve which extends round the circulating means and has one end sealed to the circulating means while its other end is attached to the vessel and sealed to the lining thereof, wherein a portion of the sleeve is embedded in the concrete of the pressure vessel.

2. A metal-lined concrete pressure vessel as claimed in claim 1 wherein said opening is provided with a metal lining which is sealed to the metal lining of the pressure vessel, and the sleeve is sealed to the metal lining of the pressure vessel by being sealed to the metal lining of the opening.

3. A metal-lined concrete pressure vessel as claimed in claim 1 wherein the end of the portion of the sleeve which is embedded in concrete is flanged.

4. A metal-lined concrete pressure vessel as claimed in claim 1 wherein the sleeve tapers towards the fluid circulating means.

5. A metal-lined concrete pressure vessel as claimed in claim 1 wherein the fluid circulating means is sealed to the sleeve by a substantially rigid metal ring which encircles the fluid circulating means.

6. A metal-lined concrete pressure vessel as claimed in claim 5 wherein the substantially rigid metal ring is integral with the sleeve and the fluid circulating means is bolted to the substantially rigid metal ring.

7. A metal-lined concrete pressure vessel as claimed in claim 5 wherein the fluid circulating means includes a housing containing an anti-back-turning device, thrust and bearing assembly, a driving shaft extending from the housing and impeller blades on the driving shaft, and in which the housing is sealed to the sleeve.

8. A metal-lined concrete pressure vessel as claimed in claim 7 wherein a bearing for the driving shaft is supported by the sleeve.

9. A metal-lined concrete pressure vessel as claimed in claim 1 wherein the pressure vessel houses a core, a biological shield, and a heat exchanger assembly of a gas-cooled nuclear reactor, and the fluid circulating means is for circulating a coolant gas from the core to the heat exchanger assembly.

References Cited

UNITED STATES PATENTS

| | | | |
|---|---|---|---|
| 3,352,756 | 11/1967 | Lockett et al. | 176—87 X |
| 3,355,357 | 11/1967 | Sage | 176—87 |
| 3,371,017 | 2/1968 | Coast et al. | 176—87 |
| 3,410,752 | 11/1968 | Dell | 176—87 |

REUBEN EPSTEIN, Primary Examiner

U.S. Cl. X.R.

176—87; 222—209; 230—1